United States Patent [19]

Coffey et al.

[11] Patent Number: 4,520,190

[45] Date of Patent: May 28, 1985

[54] PREPARATION OF POLYAMIDE FROM DINITRILE, DIAMINE AND WATER WITH P CATALYST

[75] Inventors: Gerald P. Coffey, Lyndhurst; Benedict S. Curatolo, Maple Heights; Rimvydas L. Cepulis, Euclid, all of Ohio

[73] Assignee: The Standard Oil Company, Cleveland, Ohio

[21] Appl. No.: 533,479

[22] Filed: Sep. 19, 1983

Related U.S. Application Data

[63] Continuation of Ser. No. 439,975, Nov. 8, 1982, abandoned, which is a continuation-in-part of Ser. No. 370,228, Apr. 20, 1982, abandoned, which is a continuation of Ser. No. 335,905, Dec. 30, 1981, abandoned.

[51] Int. Cl.$^3$ ............................................. C08G 69/00
[52] U.S. Cl. .................... 528/336; 528/335; 528/337; 528/346
[58] Field of Search ................................. 528/336, 335

[56] References Cited

U.S. PATENT DOCUMENTS

| | | | |
|---|---|---|---|
| 2,244,192 | 6/1941 | Flory | 528/336 |
| 2,245,129 | 6/1941 | Greenewalt | 528/336 |
| 2,927,841 | 3/1960 | Ben | 528/336 |
| 2,981,715 | 4/1961 | Ben | 528/336 |
| 3,173,898 | 3/1965 | Sum | 528/336 |
| 3,235,534 | 2/1966 | Brinkman et al. | 528/336 |
| 3,816,369 | 6/1974 | Thomas et al. | 528/336 |
| 3,825,508 | 7/1974 | Ashida et al. | 528/336 |
| 3,847,876 | 11/1974 | Onsager | 526/71 |
| 3,932,364 | 1/1976 | Yamazaki et al. | 528/336 |
| 4,113,708 | 9/1978 | Chapman et al. | 528/336 |
| 4,436,898 | 3/1984 | Hofmann et al. | 528/335 |

OTHER PUBLICATIONS

Thermal Degradation of Some Polyamides–Kamerbeek et al.; Central Research Institute of A.K.U., Netherlands, pp. 357, 362–365.

*Primary Examiner*—Harold D. Anderson
*Attorney, Agent, or Firm*—David P. Yusko; John E. Miller, Jr.; Larry W. Evans

[57] ABSTRACT

Polyamides suitable for fiber spinning are produced by contacting a diamine, a dinitrile and water in a process wherein the diamine is added gradually to the dinitrile over the course of polymerization in the presence of an oxygenated phosphorus compound catalyst.

18 Claims, No Drawings

PREPARATION OF POLYAMIDE FROM DINITRILE, DIAMINE AND WATER WITH P CATALYST

CROSS-REFERENCE TO RELATED APPLICATIONS

This is a continuation of copending application Ser. No. 439,975 filed Nov. 8, 1982, now abandoned, which was a continuation in part of Application Ser. No. 370,228 filed Apr. 20, 1982, now abandoned, which was a continuation of Application Ser. No. 335,905 filed Dec. 30, 1981, now abandoned.

BACKGROUND OF THE INVENTION

1. Field of the Invention

This invention relates to a process of preparing a polyamide, i.e. nylon, from a diamine, a dinitrile and water.

2. Description of the Prior Art

Commercial processes for preparing nylons, which use diamines and dicarboxylic acids as raw materials, are well known in the art. For example, it has been proposed that linear polyamides can be made by heating a reaction mixture comprising a dinitrile, a diamine and water. This process is disclosed in Greenwalt U.S. Pat. No. 2,245,129. The procedure disclosed in the Greenwalt patent is carried out in two stages, the first stage comprising the heating of the reaction mixture in a closed reaction vessel until a low molecular weight polyamide is formed, and the second stage comprising subsequent heating of this low molecular weight polyamide (i.e. precursor or prepolymer) to form a higher molecular weight polyamide.

Another process for preparing high molecular weight polyamides comprising contacting a dinitrile, a diamine and water is taught in Onsager, U.S. Pat. No. 3,847,876. The Onsager process requires at least equimolar amounts of the diamine and dinitrile to be initially present in the reaction vessel. Also Onsager requires that polymerization occur in the presence of controlled amounts of ammonia (at least 1 wt %, preferably 3 wt % of the total weight of the diamine, dinitrile and water) which must be maintained by the addition of ammonia to the reaction mix.

SUMMARY OF THE INVENTION

Polyamides are produced by contacting a diamine, a dinitrile and water, wherein the diamine is added gradually to the dinitrile over the course of polymerization. In one embodiment of this invention the only ammonia present in the reaction mix is that which is generated in situ, which is typically less than 1 wt % of the total weight of the diamine, dinitrile and water. In another embodiment of this invention, superior polyamides with high onset decomposition temperature (ODT) are prepared by contacting a diamine, dinitrile and water in the presence of oxygenated phosphorus compound, wherein the diamine is added gradually to the dinitrile over the course of polymerization.

DETAILED DESCRIPTION OF THE INVENTION

The Monomers:

The diamines here used are of the formula:

where R is a divalent organic radical and each R' is independently hydrogen or a univalent organic radical. R may be an aliphatic, alicyclic or an aromatic radical or a substituted derivative thereof. R' may be a hydrogen or an aliphatic, an alicyclic or an aromatic radical or a substituted derivative thereof. If substituted, the substituents are inert under the reaction conditions. Preferably R is a $C_2$–$C_{20}$ aliphatic radical, a $C_5$–$C_7$ alicyclic radical, a phenyl radical or an inertly substituted derivative of any one of these. Preferably R' is hydrogen a $C_1$–$C_{20}$ aliphatic radical, a $C_5$–$C_7$ alicyclic radical, a phenyl radical or an inertly substituted derivative of any one of these. Preferred diamines are aliphatic or aromatic diamines which contain from 4 through 12 carbon atoms such as, tetramethylenediamine, hexamethylenediamine, p-diaminodicyclohexylmethane, 4,4' diaminodicyclohexylether, 4,4' diaminodicyclohexylsulfide, octamethylenediamine, decamethylenediamine, dodecamethylenediamine and the like, i.e. wherein R is an alkylene or arylene divalent radical of 4 to 12 carbon atoms and R' is hydrogen.

The dinitriles here used are of the formula:

where R is as defined in the preceding paragraph. Preferred dinitriles are aliphatic or aromatic dinitriles which contain from 4 through 12 carbon atoms, such as, glutaronitrile, succinonitrile, adiponitrile, suberonitrile, sebaconitrile, 1,10 decane dinitrile, methyl glutaronitrile and the like; i.e. wherein R is an alkylene or arylene divalent radical of 2 to 10 carbon atoms. The diamines and dinitriles preferred for this invention are commercially available.

The Process:

Polyamides are prepared by gradually adding, i.e. either continuously or incrementally, the diamine to the dinitrile over the course of the polymerization rather than having all the diamine initially in the presence of the dinitrile. Initially, less than 50 mole percent of the diamine, more preferably less than 5 mole percent is present with the remainder of the diamine added gradually over the course of polymerization.

The amount of water present during this gradual addition of diamine may vary widely, typically between 15 to 95% by weight, based on the total weight of the diamine, dinitrile and water. Water is necessary both as a reactant and as an aid in formation of the polyamide, consequently an excess amount of water, i.e. more than a stoichiometric amount, is desired. Since the water will have to be removed at the end of the polymerization, it is preferred to limit the amount of excess water as much as possible without sacrificing polyamide properties. The water can either be initially in contact with the dinitrile or be added with the diamine or be introduced into the reaction by a combination of the two.

Ammonia is a by-product of the reaction of the diamine, dinitrile and water. Typically, this ammonia enters the vapor phase and is removed from the reaction zone (e.g. released through a pressure relief valve on the reaction vessel). Consequently, the concentration of ammonia in the liquid phase is less than about 1 wt % of the total weight of the diamine, dinitrile and water.

In one embodiment of this invention, high quality nylon-6,6 resin is prepared wherein substantially all of the ammonia is removed from the reaction system while substantially all of the water is retained. The water is eventually removed from the reaction system after at least 80% of the dinitrile has been reacted.

In order to produce these high molecular weight polyamides, it is desirable to conduct this process under specific, controlled stages. It is generally known from the prior art, i.e. U.S. Pat. No. 3,847,876, that polymerization by stages over a certain temperature/pressure profile will result in the best products. This temperature/pressure profile will generally depend upon the specific reactants used and product desired. A temperature/pressure profile which works particularly well for forming nylon-6,6 from adiponitrile, hexamethylene diamine and water is as follows. During the first stage of the reaction the temperature is maintained at 200° to 300° C., preferably at 240° to 270° C., under pressure for 2 to 4 hours. Ammonia is removed from the reaction (e.g. released through a pressure relief valve) while maintaining water concentration at a level sufficient for polymerization to proceed. The pressure is gradually reduced to atmospheric pressure as the temperature is gradually increased to between 270° and 310° C. The final stage at atmospheric pressure is under a flow of inert gases or at subatmospheric pressure.

It has been found that the molecular weight of the polyamide can be increased by performing the polymerization at high temperatures as long as the temperature is not high enough to degrade the catalyst, monomers or polyamide. Preferred temperatures are between 150° and 350° C.; more preferred are temperatures between 260° and 290° C.

This reaction is normally carried out in a pressure vessel in the absence of air. This reaction can be carried out at subatmospheric, atmospheric or superatmospheric pressure. Normally, the reaction is initially run at autogenous pressure with a later reduction to atmospheric or subatmospheric pressure. However, it is within the scope of this invention to carry out the initial reaction at constant pressure by applying an inert gas pressure to the system and adjusting this pressure as the reaction proceeds. The pressure can be maintained with a gaseous reactant or a gas inert to the reaction or some combination thereof.

The Catalyst:

In one embodiment of this invention, the reaction is conducted in the presence of an oxygenated phosphorous compound. Preferred oxygen containing phosphorous compounds are phosphoric acid or salts and esters thereof and phosphorous acid or salts and esters thereof; hypophosphorous acid or salts and esters thereof; alkyl or aryl phosphonic acid or salts and esters thereof; and alkyl or aryl phosphinous acid or salts and esters thereof. The preferred phosphonic acid is phenylphosphonic acid. Phosphorous acid, due to its higher acidity and diprotic nature, is preferred over phosphoric acid and phosphonic acid as a catalyst. Typically the amount of catalyst added is between 0.01 and 1.0 wt. % the total weight of the diamine, dinitrile and water, and preferably about 0.1 wt. % of the total weight. The method in which the catalyst is added to the monomers is not critical, the catalyst may be introduced to the reaction separately or may be added with one or both of the dinitrile and diamine.

The Polyamide:

The gradual addition of the diamine to the other reactant over the course of polymerization produces polyamides suitable for fiber spinning. When the diamine is gradually added to the nitrile in the presence of an oxygenated phosphorus compound, polyamides with superior physical properties are produced. Specifically, the polyamides produced by this gradual addition in the presence of a catalyst have higher Onset Decomposition Temperatures (ODT). The Onset Decomposition Temperature is directly related to the thermal stability of the polymer, the higher the ODT, the more thermally stable the polyamide. Polyamides prepared by the continuous or incremental addition of the diamine in the presence of the catalyst, have an ODT higher than 330° C. This higher stability has economic value in the marketplace since less thermal degradation will take place during processing of the polymer. For example, a fiber spinning line will need to shut down for cleaning less often when the polymer has a higher thermal stability.

It is postulated that the following mechanism accounts for the polymers described herein having better thermal stability. Polyamides derived from dinitriles and diamines may proceed by the following pathway:

$$NCR'''CN + H_2NR^{IV}NH_2 \longrightarrow$$

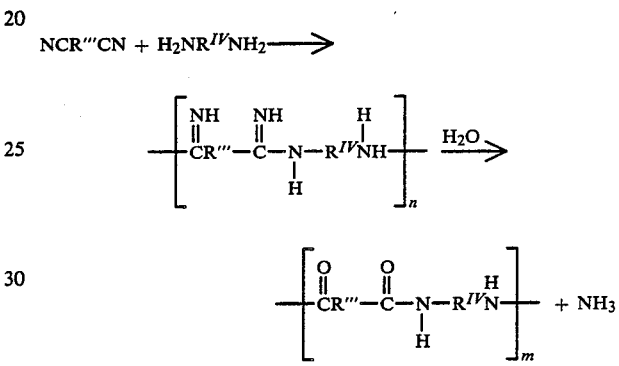

wherein R''' and $R^{IV}$ are independently an aliphatic, an alicyclic or an aromatic radical or an inertly substituted derivative thereof and where n is the number of repeating units.

The intermediate formed in this reaction is theorized to be an amidine which is subsequently hydrolyzed to the amide. In addition to hydrolysis of the amidine intermediate to the amide, competitive N, N'-dialkylamidine formation is possible via reaction of the amidine with a second molecule of a diamine. Thus, this competing reaction may be represented as follows:

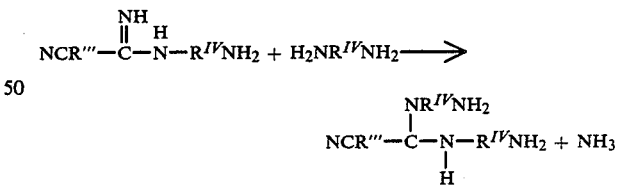

When the reaction proceeds as desired through the hydrolysis of the amidine route to form the polyamide and when R''' and $R^{IV}$ are alkyl radicals, the resultant polyamide can be represented as follows:

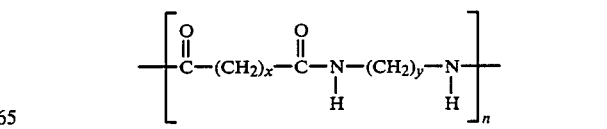

wherein x is 2-12; and y is 2-15 and n is a positive integer. However, the N, N'-dialkylamidine can form side chains off this polymer backbone. The polymer repeating unit containing these side chains is called a defect structure and can be represented as follows:

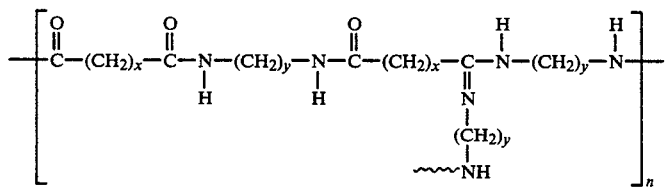

Even though these defect structures may only be present in extremely low parts per million concentrations, so low that they cannot be detected by conventional means, they would be expected to confer undesirable thermal instability to the polyamide. Thus, it is important to reduce the secondary reaction to the N, N'-dialkylamidine as much as possible so as to reduce the amount of defect structures. Adding the diamine continuously or incrementally during the course of the polymerization rather than adding all of it initially reduces the concentration of the diamine in the reaction vessel and thus reduces the chance of the secondary reaction occuring. These defect structures could also have the effect of impeding the normal crystallization rate during fiber spinning and orientation.

SPECIFIC EMBODIMENTS

In order to provide a better understanding of the present invention, the following working examples are presented. Examples 1–3 and Comparative Examples A, B, C, and D illustrate the benefits of continuous or incremental addition of the diamine to the dinitrile in the presence of the catalyst.

EXAMPLE 1

A 450 ml. Parr autoclave was equipped with a nitrogen inlet, a reactant inlet line, an anchor agitator, and a condenser connected to a back pressure regulator adjusted to 600 psi. To the autoclave was added 54.08 grams of adiponitrile (0.5 mole) and 38.0 grams of distilled water. The autoclave was then sealed and flushed 3 times with 150 psi nitrogen.

A solution A was prepared for pumping into the autoclave through a Milton-Roy minipump. Solution A comprised 58.10 grams of hexamethylenediamine, 74.0 grams of distilled water and 0.112 grams of phosphorous acid (0.1 weight percent based on the total adiponitrile and hexamethylenediamine used). Solution A was stored under nitrogen.

After the stirred adiponitrile/water mixture in the autoclave reached a temperature of 250° C., the pump was turned on and solution A was pumped into the autoclave linearly over 4 hours and 15 minutes. During the addition, the contents of the autoclave were maintained as close to 250° C. as possible. With the back pressure regulator set at 600 psi, essentially only ammonia produced in the polymerization was lost during the continuous addition process. After all of the solution A had been added, the contents of the autoclave were allowed to react an additional 15 minutes at 250° C. At the end of this time, the back pressure regulator was carefully adjusted to gradually reduce the pressure over 45 minutes to nitrogen line pressure (150 psi). During this pressure reduction process, the temperature fluctuated between about 230° to 265° C. The autoclave was then swept with nitrogen for 15 minutes, maintaining the temperature at about 250° C. The autoclave was then cooled to room temperature under nitrogen.

The polymeric material produced was removed from the autoclave and ground in a laboratory Wiley mill through a 10 mesh screen. A 50.29 gram sample of ground, crude polymer was slurried in 500 ml. of distilled water and heated with stirring until the aqueous slurry reaches a low boil. After filtering, the solid was placed in 500 ml. methanol and heated with stirring for approximately one hour. Filtering and drying the solid in a 55° C. vacuum oven for about 48 hours yielded 49.72 grams of polymer (98.9% insolubility). The polymer was identified as nylon-6,6 resin. The intrinsic viscosity of this resin was 0.79 dl/g as measured in 90% formic acid at 25° C.

Thermal analysis was performed using a DuPont 990 Thermal Analyzer with a differential scanning calorimeter (DSC) cell under nitrogen atmosphere at a heating rate of 10° C. per minute. The onset decomposition temperature, that point on a DSC curve after the melting point wherein the slope changes, was about 345° C. A thermal gravimetric analysis (TGA) was also used on this polymer. The percentage weight loss for this polymer was 0.26% between 225° and 325° C., and 1.9% between 325° and 390° C.

EXAMPLE 2

A procedure similar to that outlined in Example 1 was followed except that the polymerization temperature was increased to 285°–290° C. and the hexamethylene diamine/phosphorous acid was added linearly over 45 minutes. The total polymerization time after heat-up was 1.5 hours. The resin was isolated and washed as described in Example 6. The resin insolubility was 99.5%. The intrinsic viscosity was 0.91 dl/g as measured in 90% formic acid at 25° C. The onset decomposition temperature was 345° C. The percentage weight loss (TGA) for this polymer was 0.35% between 225° and 325° C. and 4.3% between 325° and 390° C.

EXAMPLE 3

The procedure of Example 1 was repeated except that the time of nitrogen sweeping at the end of the polymerization was increased to 30 minutes to improve resin molecular weight. After isolation and washing, resin insolubility was 99.7%. The intrinsic viscosity of this polymer was 1.03 dl/g as measured in 90% formic acid at 25° C. The onset decomposition temperature was 350° C. The percentage weight loss (TGA) for this polymer was 0.45% between 225° and 325° C. and 2.6% between 325° and 390° C.

COMPARATIVE EXAMPLE A

The procedure of Example 1 was repeated except that no phosphorus acid was used. The resulting polymer was identified as nylon-6,6 resin. the intrinsic viscosity of this resin was 0.49 dl/g as measured in 90% formic acid at 25° C. The onset decomposition temperature was 315° C.

COMPARATIVE EXAMPLE B

To the autoclave used in Example 1, was added 54.08 grams of adiponitrile (0.5 mole), 58.10 grams a hexamethylene diamine (0.5 mole), 74.0 grams of distilled water and 0.112 grams of phosphorous acid (0.1 weight percent based on adiponitrile and hexamethylene diamine). The autoclave was sealed and the contents were purged 3 times with 160 psi nitrogen. The contents were heated and stirred until the temperature was 250° C. The contents were then stirred at 250° C. under autogenous pressure for 1.5 hours and the pressure was reduced to about 250 psi over 8 minutes. The effluent is collected by means of a condenser during this pressure reduction. The contents were then heated autogenously at 250° C. for an additional 1.5 hours. The pressure was again reduced to about 250 psi over 5 minutes. Polymerization was continued an additional 1 hour at 250° C. and 270 to 280 psi. After this, pressure was vented to 0 psig, repressured with 150 psi nitrogen, and the contents were cooled to room temperature under nitrogen. The resulting polymer was identified as nylon-6,6 resin. This resin was isolated and washed as described in Example 6. The insolubility was found to be 98.9%. The intrinsic viscosity of this resin was 0.77 dl/g as measured in 90% formic acid at 25° C.

The onset decomposition temperature for this polymer was 300° C. The percentage weight loss (TGA) for this polymer was 0.42% between 225° and 325° C. and 6.4% between 325° and 390° C.

COMPARATIVE EXAMPLE C

A commercial nylon-6,6 resin was purchased from Aldrich Chemical Company (catalogue number: 18,112-9). The onset decomposition temperature was 330° C. The percentage weight loss (TGA) for this polymer was 0.26% between 225° and 325° C. and 1.5% between 325° and 390° C.

COMPARATIVE EXAMPLE D

A commercial nylon-6,6 resin was purchased from Akulon Chemical Company. The onset decomposition temperature was 325° C. The percentage weight loss (TGA) for this polymer was 0.31% between 225° and 325° C. and 1.7% between 325° and 390° C.

In Examples 1, 2 and 3, nylon-6,6 resins, derived from adiponitrile, hexamethylenediamine and water in the presence of a catalyst and by the gradual addition of the diamine to the dinitrile, had Onset Decomposition Temperatures greater than 340° C. In Comparative Example A (no catalyst), Comparative Example B (batch process with catalyst) and Comparative Examples C and D (commercially available nylon-6,6), the Onset Decomposition Temperatures were 330° C. or less. These Examples reveal that polyamides prepared from a diamine, dinitrile and water in the presence of a catalyst and by the gradual addition of the diamine to the dinitrile have superior thermal stability over polyamides produced by prior art processes.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims.

We claim:
1. A process for producing a fiber forming polyamide comprising contacting a dinitrile, water and a diamine wherein
   (A) the diamine is added gradually to the nitrile during the course of polymerization;
   (B) the dinitrile, water and diamine are contacted with an oxygenated phosphorus compound catalyst; and
   (C) no ammonia is added to the reactants and the only ammonia which is present during polymerization is that which is generated in situ.
2. The process of claim 1 wherein the oxygenated phosphorus compound is selected from the group consisting of (1) phosphoric acid or esters or salts thereof; (2) phosphorus acid or esters and salts thereof; (3) hypophosphorus acid or esters or salts thereof; (4) aryl phosphonic acid or esters or salts thereof; and (5) aryl phosphinous acid or esters or salts thereof.
3. The process of claim 2 wherein the oxygenated phosphorus compound is phorphorus acid.
4. The process of claim 1 wherein the diamine is added substantially continuously during the course of the reaction.
5. The process of claim 1 wherein the diamine is added incrementally during the course of reaction.
6. The process of claim 1 wherein less than 5 mole percent of the diamine is initially present in the reaction vessel with the rest of the diamine being added during the course of the polymerization.
7. The process of claim 1 wherein the amount of ammonia present in a liquid phase during polymerization is less than about 1 weight percent of the diamine, dinitrile and water.
8. The process of claim 1 wherein between 15% and 95% by weight of water is present in the reaction system based on the total weight of the dinitrile, diamine and water.
9. The process of claim 8 wherein essentially all of the water is added with the diamine.
10. The process of claim 8 wherein essentially all of the water is initially in contact with the dinitrile.
11. The process of claim 8 wherein part of the water is added with the diamine and part of the water is initially in contact with the dinitrile.
12. The process of claim 1 wherein the diamine is selected from the group consisting of tetramethylenediamine, octamthylenediamine, decamethylenediamine, dodecamethylenediamine, hexamethylenediamine, p-diaminodicyclohexylmethane, 4,4' diaminodicyclohexylether and 4,4' diaminodicyclohexylsulfide.
13. The process of claim 1 wherein the dinitrile is selected from the group consisting of glutaronitrile, succinonitrile, adiponitrile, suberonitrile, sebaconitrile, 1,10 decane dinitrile and methyl glutaronitrile.
14. The process of claim 1 wherein substantially all of the water is retained in the reaction system until at least 80% of the dinitrile has reacted.
15. The process of claim 1 wherein the process is conducted in a temperature range of 150° to 350° C.
16. The process of claim 15 wherein the process is conducted in a temperature range of 260° to 290° C.
17. The process of claim 1 wherein the process is at least partially conducted under superatmospheric pressure.
18. The process of claim 13 wherein the process is conducted in a pressure range of 100 to 1000 psi.

* * * * *